United States Patent
Konersmann

(10) Patent No.: US 9,262,494 B2
(45) Date of Patent: Feb. 16, 2016

(54) IMPORTING DATA INTO DYNAMIC DISTRIBUTED DATABASES

(71) Applicant: Microsoft Corporation, Redmond, WA (US)

(72) Inventor: Scott Anthony Konersmann, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 14/144,409

(22) Filed: Dec. 30, 2013

(65) Prior Publication Data

US 2015/0186479 A1 Jul. 2, 2015

(51) Int. Cl.
- *G06F 17/00* (2006.01)
- *G06F 17/30* (2006.01)
- *H04L 29/08* (2006.01)

(52) U.S. Cl.
CPC ...... *G06F 17/30563* (2013.01); *H04L 67/1097* (2013.01)

(58) Field of Classification Search
CPC .......... G06F 17/00; G06F 17/30; G06F 11/00
USPC .................................................. 707/600–899
See application file for complete search history.

(56) References Cited

U.S. PATENT DOCUMENTS

| | | | |
|---|---|---|---|
| 2012/0109892 A1 | 5/2012 | Novik et al. | |
| 2012/0109926 A1 | 5/2012 | Novik et al. | |
| 2013/0031136 A1 | 1/2013 | Shah | |
| 2013/0132403 A1 | 5/2013 | Liu et al. | |
| 2013/0254196 A1* | 9/2013 | Babu .................. | G06F 17/30595 707/736 |

OTHER PUBLICATIONS

"Bulk Import and Export of Data (SQL Server)", Published on: Apr. 27, 2012, Available at: http://technet.microsoft.com/en-us/library/ms175937.aspx.

"Database Sharding—Scaling Data in a Multi Tenant Environment", Published on: Sep. 24, 2012, Available at: http://blog.techcello.com/2012/07/database-sharding-scaling-data-in-a-multi-tenant-environment/.

"SQL Azure Federation Data Migration Wizard", Published on: Jan. 24, 2012, Available at: http://sqlazurefedmw.codeplex.com/.

"Moving to Multi-Tenant Database Model Made Easy with SQL Azure Federations", Published on: Mar. 23, 2011, Available at: http://blogs.msdn.com/b/cbiyikoglu/archive/2011/03/23/moving-to-multi-tenant-model-made-easy-with-sql-azure-federations.aspx.

* cited by examiner

*Primary Examiner* — Isaac M Woo

(74) *Attorney, Agent, or Firm* — Nicholas Chen; Kate Drakos; Micky Minhas

(57) ABSTRACT

The present invention extends to methods, systems, and computer program products for importing data into dynamic distributed databases. Embodiments of the invention include an import service that facilitates data imports without any distribution logic on a tenant. A tenant (caller) provides data in essentially any order. The import service understands the distribution of data across multiple databases and determines for any given piece of import data what database the import data is to be inserted into. Accordingly, the tenant (caller) is relieved from having to know how the data is distributed across a set (of potentially hundreds or thousands) of databases. The import service can group sets of data destined for a given database together and can use batch operations to increase efficiency.

20 Claims, 8 Drawing Sheets

IMPORTING DATA INTO DYNAMIC DISTRIBUTED DATABASES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In database environments, users can use tools and algorithms to load data into databases. These tools normally only work on a single table (or at best database) at a time. However, as databases become larger, there is a need to split data across many databases to handle the scale. When data is split, users are forced to perform various manual actions and/or write tenant side code that understands the data distribution. The tenant code can then be executed to import data. However, each time data is split (or subsequently merged), the tenant side code has to be rewritten and compiled to adjust for the new distribution. Thus, adjusting for changed distributions can result in considerable work for a user.

Alternately, it is possible to write code so that data distribution can be changed via configuration. However, it takes a configuration change and downtime to update the system.

In many organizations, responsibilities for importing data and splitting databases can belong to different individuals. For example, a database administrator may be responsible for maintaining an appropriate database distribution based on available resources. On the other hand, an application developer may be responsible for maintaining an application that imports data into a database. Lack of communication between the database administrator and application developer can result in non-functioning applications. For example, if the database administrator fails to communicate a new database distribution from splitting a database, a data import application may stop working. Even when the application developer is made aware of the split, it may take some amount of time for the application developer to modify the data import application for use with the new data distribution.

In other environments, such as, for example, multi-tenant, multi-database environments, a database administrator may have no control over data distribution. For example, cloud database environments can maintain multiple databases per tenant and can service many tenants. In a cloud database environment, modules within the cloud environment can automatically split and/or merge databases as appropriate. Splitting and/or merging databases can be based on a customer's needs, available resources within the cloud environment, needs of other customer's, etc. As such, an application developer may have no way to know a data distribution for corresponding data. Further, in a cloud environment, data distributions can change with some regularity. Thus, when a database is operated in a cloud environment, it can be extremely difficult for an application developer to maintain a data import application.

BRIEF SUMMARY

The present invention extends to methods, systems, and computer program products for importing data into dynamic distributed databases. A computer system is included in a dynamic distributed database system. The dynamic distributed database system maintains a plurality of databases across a plurality of nodes. In some embodiments, the dynamic distributed database system includes a multi-tenant database including a plurality of distributed databases for a plurality of tenants. Each distributed database can include one or more databases. In any of these environments, data can be imported into a database maintained by the dynamic distributed database system.

The computer system accesses a portion of data for a tenant. The portion of tenant data is within a data range of a database within the dynamic distributed database system. The computer system accesses a global partition map for the dynamic distributed data system. The global partition map maps tenant data ranges to databases from among the plurality of databases and maps databases to nodes from among the plurality of nodes.

The computer system refers to the global partition map to identify a database, from among the plurality of databases, that is to store the portion of tenant data based on the data range. The computer system refers to the global partition map to identify a node, from among the plurality of nodes, that hosts the database. The computer system schedules the portion of tenant data for import into the database by enqueuing the portion of tenant data in a queue for the node.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
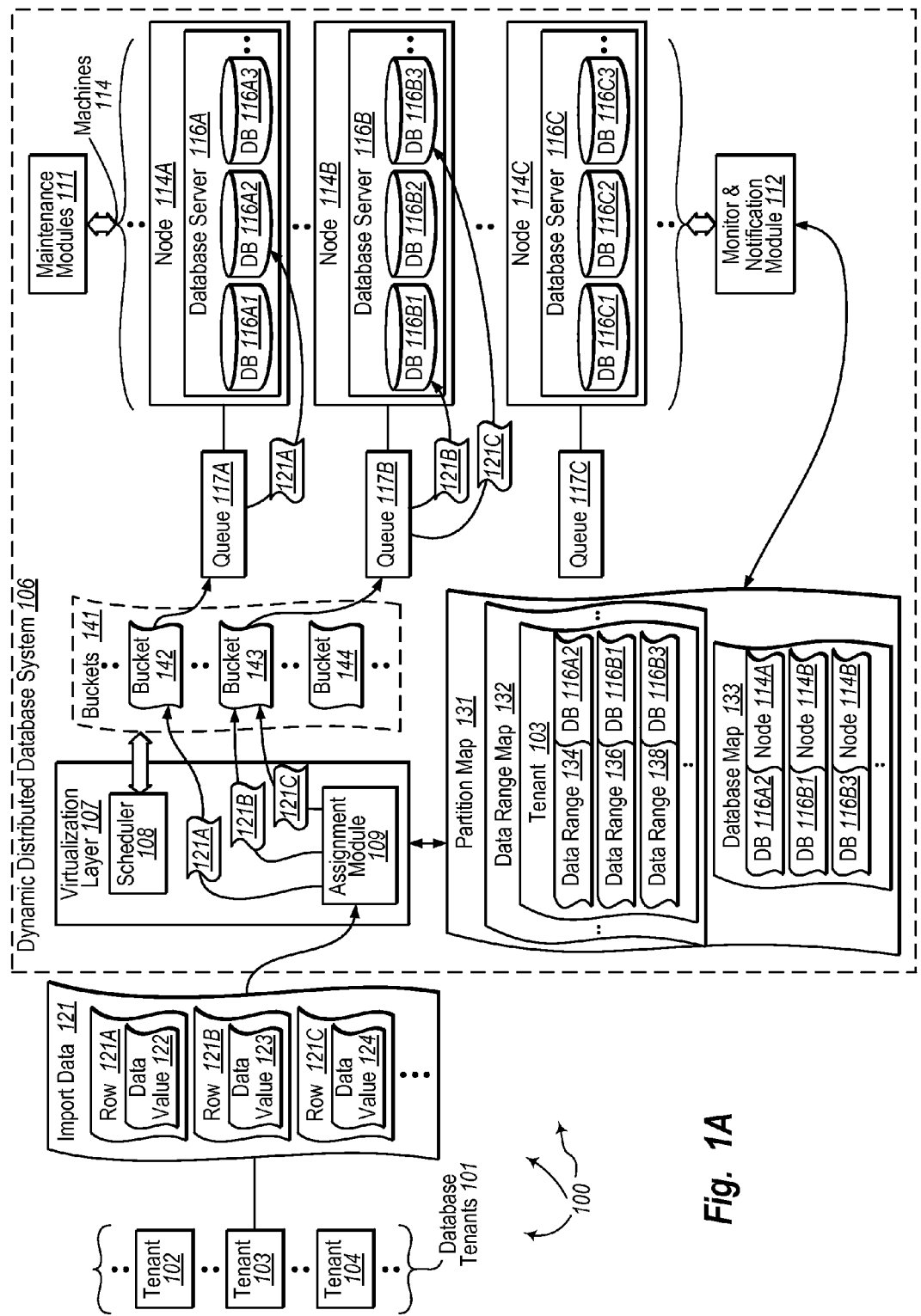
FIG. 1A illustrates an example computer architecture that facilitates importing data into a dynamic distributed database.

The present invention extends to methods, systems, and computer program products for importing data into dynamic distributed databases. A computer system is included in a dynamic distributed database system. The dynamic distributed database system maintains a plurality of databases across a plurality of nodes. In some embodiments, the dynamic distributed database system includes a multi-tenant database including a plurality of distributed databases for a plurality of tenants. Each distributed database can include one or more databases. In any of these environments, data can be imported into a database maintained by the dynamic distributed database system.

The computer system accesses a portion of data for a tenant. The portion of tenant data is within a data range of a database within the dynamic distributed database system. The computer system accesses a global partition map for the dynamic distributed data system. The global partition map maps tenant data ranges to databases from among the plurality of databases and maps databases to nodes from among the plurality of nodes.

The computer system refers to the global partition map to identify a database, from among the plurality of databases, that is to store the portion of tenant data based on the data range. The computer system refers to the global partition map to identify a node, from among the plurality of nodes, that hosts the database. The computer system schedules the portion of tenant data for import into the database by enqueuing the portion of tenant data in a queue for the node.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention include an import service that facilitates data imports without any distribution logic on a tenant. A tenant (caller) provides data in essentially any order. The import service understands the distribution of data across multiple databases and determines for any given piece of import data what database the import data is to be inserted into. Accordingly, the tenant (caller) is relieved from having to know how the data is distributed across a set (of potentially hundreds or thousands) of databases.

The import service can group sets of data destined for a given database together and can use batch operations to increase efficiency. The import service can understand the way data is allocated across databases (e.g., as a result of online split operations and/or merge operations), how databases are placed on individual nodes (machines), movement of databases between nodes (e.g., for load balancing or servicing), and what other operations are occurring during the import. The import service can use this information to increase import efficiency as well as increase resiliency to failures.

The import service can be aware of multi-tenancy and can optimize an import process to provide load balancing and fairness across a dynamic distributed database system, such as, a cloud database system. For example, the import service can insure that a large import by one tenant does not deprive the import of another tenant of appropriate resources.

FIG. 1A illustrates an example computer architecture that facilitates importing data into a dynamic distributed database. Referring to FIG. 1A, computer architecture 100 includes database tenants 101 and dynamic distributed database system 106. Each of database tenants 101 and dynamic distributed database system 106 can be connected to one another over (or be part of) a network, such as, for example, a Local Area Network ("LAN"), a Wide Area Network ("WAN"), and even the Internet. Accordingly, each of database tenants 101 and dynamic distributed database system 106 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, dynamic distributed database system 106 (e.g., a cloud database system) includes virtualization layer 107, maintenance modules 111, monitor and notification module 112, and machines 114. Database tenants 101 include tenants 102, 103, and 104 (vertical ellipses indicate that other tenants before, between, and after tenants 102, 103, and 104 may exist). Each of tenants 102, 103, and 104 can store data in one or more databases managed by dynamic distributed database system 106. In general, virtualization layer 107 abstracts the underlying hardware, data layout, data storage locations, database locations, data movement, database movement, etc., within dynamic distributed database system 106 from database tenants. As such, each database tenant is essentially provided a logical view of a dedicated database.

Figure 1B:
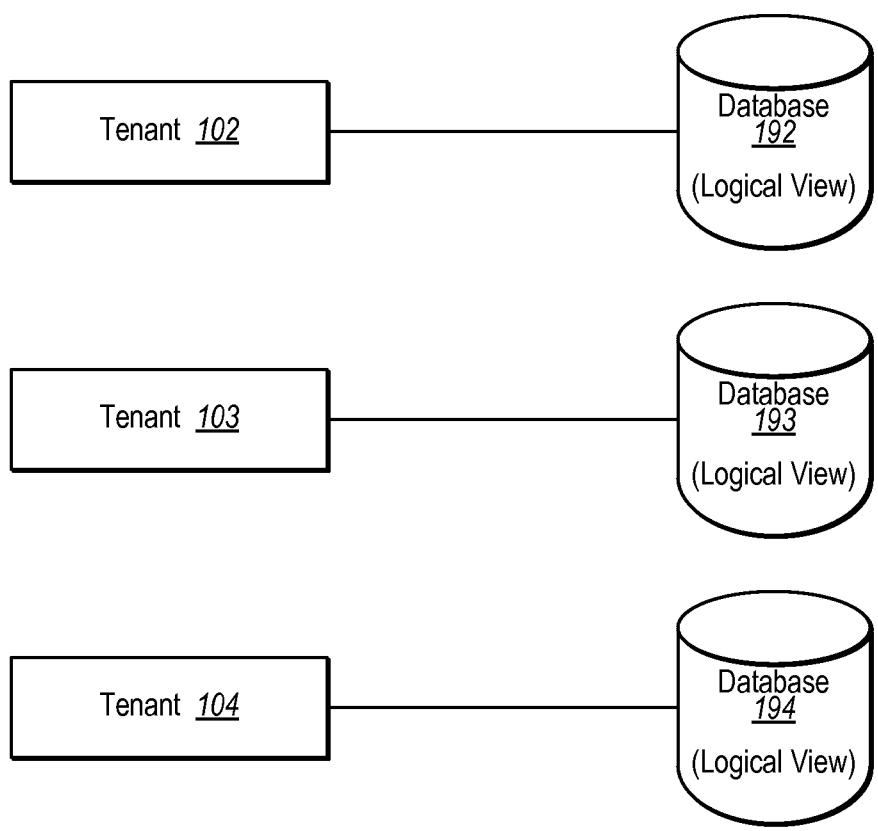
FIG. 1B illustrates an example of logical database views provided to dynamic distributed database tenants.

Turning briefly to FIG. 1B, tenants 102, 103, and 104 can be provided with logical views of databases 192, 193, and 194 respectively (even though data for each tenants 102, 103, and 104 can be stored on and moved between different databases and nodes of dynamic distributed database system 106). Database tenants can interact with a provided logical view as if interacting with a dedicated database. For example, tenants 102, 103, and 104 can interact with logical views of databases 192, 193, and 194 respectively as if interacting with individual dedicated databases. Tenants 102, 103, and 104 can do so even when tens, hundreds, or even thousands of other tenants are also interacting with dynamic distributed database system 106 through other abstracted logical views to store and access data.

Returning to FIG. 1A, machines 114 includes nodes 114A, 114B, 114C, etc. (vertical ellipses indicate that other tenants before, between, and after nodes 114A, 114B, and 114C may exist). Each machine can include a database server (e.g., a SQL server). For example, nodes 114A, 114B, 114C, etc. include database servers 116A, 116B, 116C, etc., respectively Each database server can maintain one or more databases for storing tenant data. For example, database server 116A includes databases 116A1, 116A2, 116A3, etc. Database server 116B includes databases 116B1, 116B2, 116B3, etc. Database server 116C includes databases 116C1, 116C2, 116C3, etc. Database servers can maintain virtually any number of databases and the number of databases maintained by different database servers can vary. Further, data ranges for a plurality of different tenants can be stored at a database.

Maintenance modules 111 issue instructions to machines 114 to change underlying hardware, to change data layout, to change data storage locations, to change database locations, to move data, to move databases, etc., For example, maintenance modules 111 can issue instructions to move a data range for a tenant from one database to another database, can issue instructions to merge data ranges for a tenant at a database, can issue instructions to split a data range for a tenant between a plurality of database, can issue instructions to move a database from one node to another node, etc. Maintenance modules 111 can issue instructions in an automated manner and/or can issue instructions in response to instructions from administrators.

From time to time or at specified intervals, maintenance modules 111 can monitor resource usage at nodes included machines 114 can issue instructions to balance resource usage. For example, if one node is experiencing higher resource usage, a portion of the data ranges and/or databases at the node can be moved to another node with lower resource usage. If maintenance modules 111 detect a node or database failure, maintenance modules 111 can issue instructions to move appropriate data ranges and/or databases to other nodes. Maintenance modules 111 can also issue instructions to lock appropriate data ranges and/or databases so that further data is not stored at failing components.

An administrator can also issue commands to maintenance modules 111. For example, an administrator can send commands to take down a specified node. In response, maintenance modules 111 can issue instructions to move databases at the node to one or more other nodes. Likewise, an administrator can flag a newly added node as available. In response, maintenance modules 111 can issue instructions to move databases from one or more other nodes to the newly available node.

Accordingly, underlying hardware, data layout, data storage locations, database locations, etc. of machines 114 can change overtime. In general, partition map 131 maps data ranges to databases and databases to nodes. For example, as depicted, partition map 131 includes data range map 132 and database map 133.

On a per tenant basis, data elements in data range map 132 map data ranges for the tenant to a corresponding databases. As depicted, data range map 132 includes data ranges to databases mappings for tenant 103. Similar data range maps for tenants 102 and 104, as well as any other tenants, can also be included in data range map 132. Database map 133 maps databases to corresponding nodes.

In general, monitor and notification module 112 is configured to update partition map 131 as changes at machines 114 are detected. From time to time or at specified intervals, monitor and notification module 112 can poll machines 114 to determine a configuration. In some embodiments, components of machines 114 notify monitor and notification module 112 when a change occurs. For example, a node can notify monitor and notification module 112 when a database is added to or removed from the node. Similarly, a database server can notify monitor and notification module 112 when a data range is added to or removed from a database maintained by the database server.

In response to detected changes and/or notifications, monitor and notification module 112 can update partition map 131 as appropriate to indicate more recent configurations at machines 114. Monitor and notification module 112 can add, delete, change, modify, etc., mappings in data range map 132 and/or database map 133. For example, monitor and notification module 112 can delete one data range to database mapping and add two new data range to database mappings when a data range is split. On the other hand, monitor and notification module 112 can delete two data range to database mappings and add one new data range to database mapping when two data ranges are merged. Monitor and notification module 112 can also remove, add, and modify database to node mappings as movement of database between nodes is detected.

Virtualization layer 107 further includes scheduler 108 and assignment module 109. Assignment module 109 is configured to receive import data from a tenant and move the portions of the import data (e.g., rows) into appropriate buckets 141. Based on a data value (e.g., a primary key value) in a portion of data (e.g., a row) from a tenant, assignment module 109 can refer to a data range map 132 for the tenant. From the data range map 132, assignment module 109 can determine what data range includes the data value. Assignment module 109 can then refer to the corresponding database for that data range. Assignment module 109 can then move the portion of import data to a bucket for the corresponding database.

Buckets 141 are configured to accumulate data until a specified condition is satisfied. Buckets 141 can be configured to have a specified size. Specified conditions can include a bucket becoming full (i.e., the bucket containing data equal to or approaching the specified size) or expiration of a recurring time period.

Scheduler 108 is configured to enqueue buckets into appropriate queues and schedule queues for processing. As such, when a specified condition is satisfied for a bucket, scheduler 108 can enqueue the bucket in a queue for a node where the database is maintained. Each node can have a queue. For example, nodes 114A, 114B, and 114C have queues 117A, 117B, and 117C respectively. Data can be dequeued from the queue in a specified manner for storage in the corresponding database. In some embodiments, each node has one or more threads that process the queue for the node. Scheduler 108 can schedule the one or more threads to dequeue data from the queue and store dequeued data in the corresponding database at the node.

In some embodiments, scheduler 108 enqueues data when either a bucket becomes full or a recurring time period expires. As such, buckets for more sparsely populated data ranges can still be processed with some regularity. Use of a recurring time period can help insure that data for more sparsely populated data ranges is imported even when a corresponding bucket would take longer than the recurring time period to fill.

Figure 2:
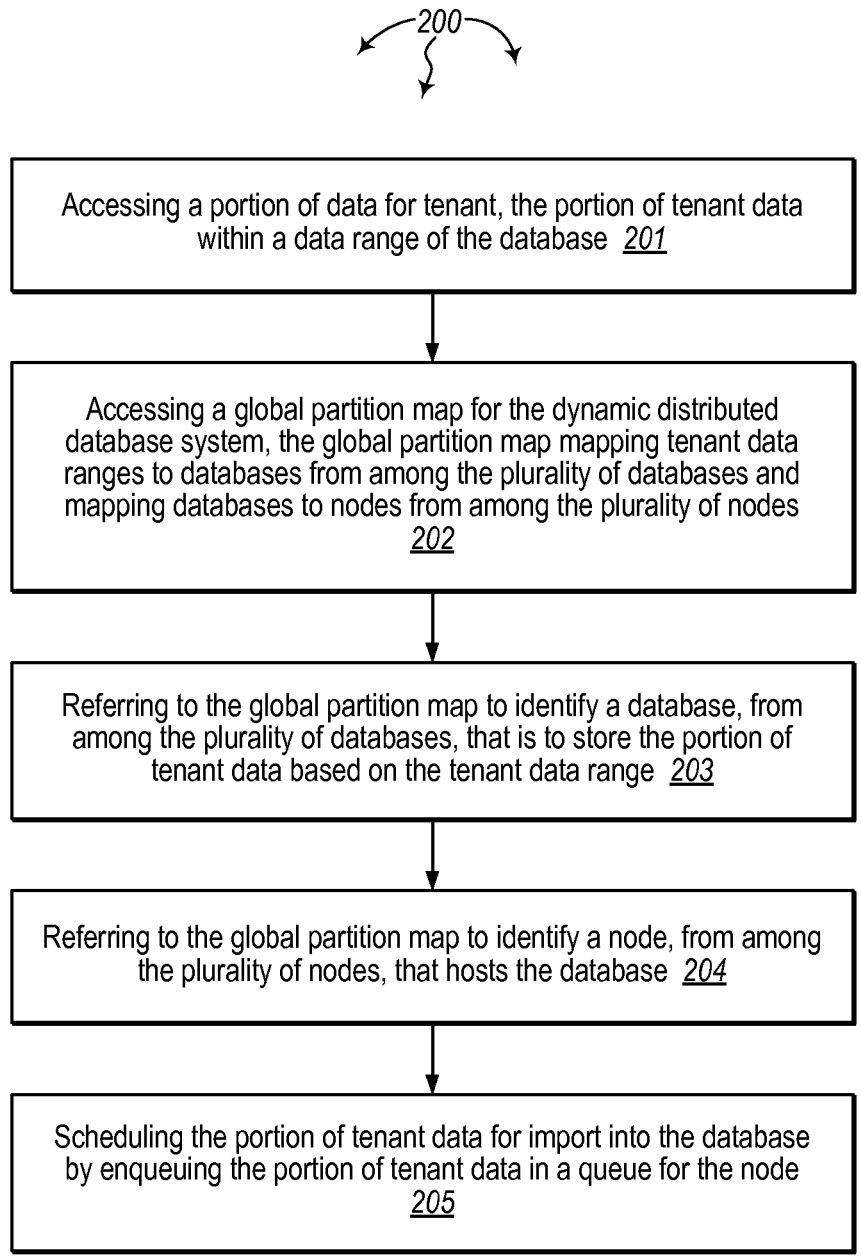
FIG. 2 illustrates a flow chart of an example method for importing data into a dynamic distributed database.

FIG. 2 illustrates a flow chart of an example method 200 for importing data into a dynamic distributed database. Method 200 will be described with respect to the components and data of computer architecture 100.

Method 200 includes accessing a portion of data for tenant, the portion of tenant data within a data range of the database (201). For example, assignment module 109 can access import data 121 for tenant 103. Import data 121 includes rows 121A, 121B, 121C, etc., having corresponding data values (e.g., a primary key value) 122, 123, and 124, etc., respectively. Each of data values 122, 123, and 124, etc., can be within the data range of a database for tenant 103.

Method 200 includes accessing a global partition map for the dynamic distributed database system, the global partition map mapping tenant data ranges to databases from among the plurality of databases and mapping databases to nodes from among the plurality of nodes (202). For example, assignment module 109 can access partition map 131. As described, partition map 131 includes data range 132 and database map 133. Data range 132 maps data ranges for tenant 132 to corresponding databases. Database map 133 maps databases to corresponding nodes from among machines 114.

Method 200 includes referring to the global partition map to identify a database, from among the plurality of databases, that is to store the portion of tenant data based on the tenant data range (203). For example, assignment module 109 can determine that data value 122 is in data range 134. Assignment module 109 can then refer to data range map 132 (for tenant 103) to identify that data range 134 is mapped to database 116A2. Based on the identification, assignment module 109 considers database 116A2 for storing row 121A.

Similarly, assignment module 109 can determine that data value 122 is in data range 136. Assignment module 109 can then refer to data range map 132 (for tenant 103) to identify that data range 136 is mapped to database 116B1. Based on the identification, assignment module 109 considers database 116B1 for storing row 121B.

Similarly, assignment module 109 can determine that data value 123 is in data range 138. Assignment module 109 can then refer to data range map 132 (for tenant 103) to identify that data range 138 is mapped to database 116B3. Based on the identification, assignment module 109 considers database 116B3 for storing row 121C.

Method 200 includes referring to the global partition map to identify a node, from among the plurality of nodes, that hosts the database (204). For example, assignment module 109 can refer to database map 133 to identify that database 116A2 is hosted at node 114A. Similarly, assignment module 109 can refer to database map 133 to identify that database 116B1 is hosted at node 114B. Similarly, assignment module 109 can refer to database map 133 to identify that database 116B3 is also hosted at node 114B.

Method 200 includes scheduling the portion of tenant data for import into the database by enqueuing the portion of tenant data in a queue for the node (205). For example, assignment module 109 can move row 121A into bucket 142. Bucket 142 can be a bucket for storing data in databases (including database 116A2) at node 114A. For example, assignment module 109 can also move other data (e.g., other rows) into bucket 142. The other data can be for storage at databases 116A1, 116A2, 116A3, etc. As such, row 121A can be grouped with other data for storage at databases 116A1, 116A2, 116A3, etc. Other data stored in bucket 142 can be data from tenant 103 or from other database tenants 101 (e.g., tenants 102 or 104). Accordingly, data from a plurality of different tenants can be grouped into the same bucket. Grouping data from the same or different tenants can improve efficiency of importing data.

Subsequently, when a specified condition is satisfied (e.g., bucket 142 is full or a specified recurring time period expires), scheduler 108 can move bucket 142 to queue 117A. Scheduler 108 can then schedule processing of queue 117A so that row 121A is stored in database 116A2. For example, scheduler 108 can schedule a thread for queue 117A to dequeue data in bucket 142 (including row 121A) and store the dequeued data in the corresponding databases (including database 116A2) managed by database server 116A.

Similarly, assignment module 109 can move row 121B into bucket 143. Bucket 143 can be a bucket for storing data in databases (including database 116B1 and 116B3) at node 114B. As such, assignment module 109 can also move row 121C into bucket 143. Further, assignment module can also move other data (e.g., other rows) into bucket 143. The other data can be for storage at databases 116B1, 116B2, 116B3, etc. As such, rows 121B and 121C can be grouped with other data for storage at databases 116B1, 116B2, 116B3, etc. Other data stored in bucket 143 can be data from tenant 103 or from other database tenants 101 (e.g., tenants 102 or 104). As described, grouping data from the same or different tenants can improve efficiency of importing data.

Subsequently, when a specified condition is satisfied (e.g., bucket 143 is full or a specified recurring time period expires), scheduler 108 can move bucket 143 to queue 117B. Scheduler 108 can then schedule processing of queue 117B so that row 121B is stored in database 116B1 and row 121C is stored in database 116B3. For example, scheduler 108 can schedule a thread for queue 117B to dequeue data in bucket 143 (including rows 121B and 121C) and store the dequeued data in the corresponding databases (including databases 116B1 and 116B3) managed by database server 116B.

Figure 3:
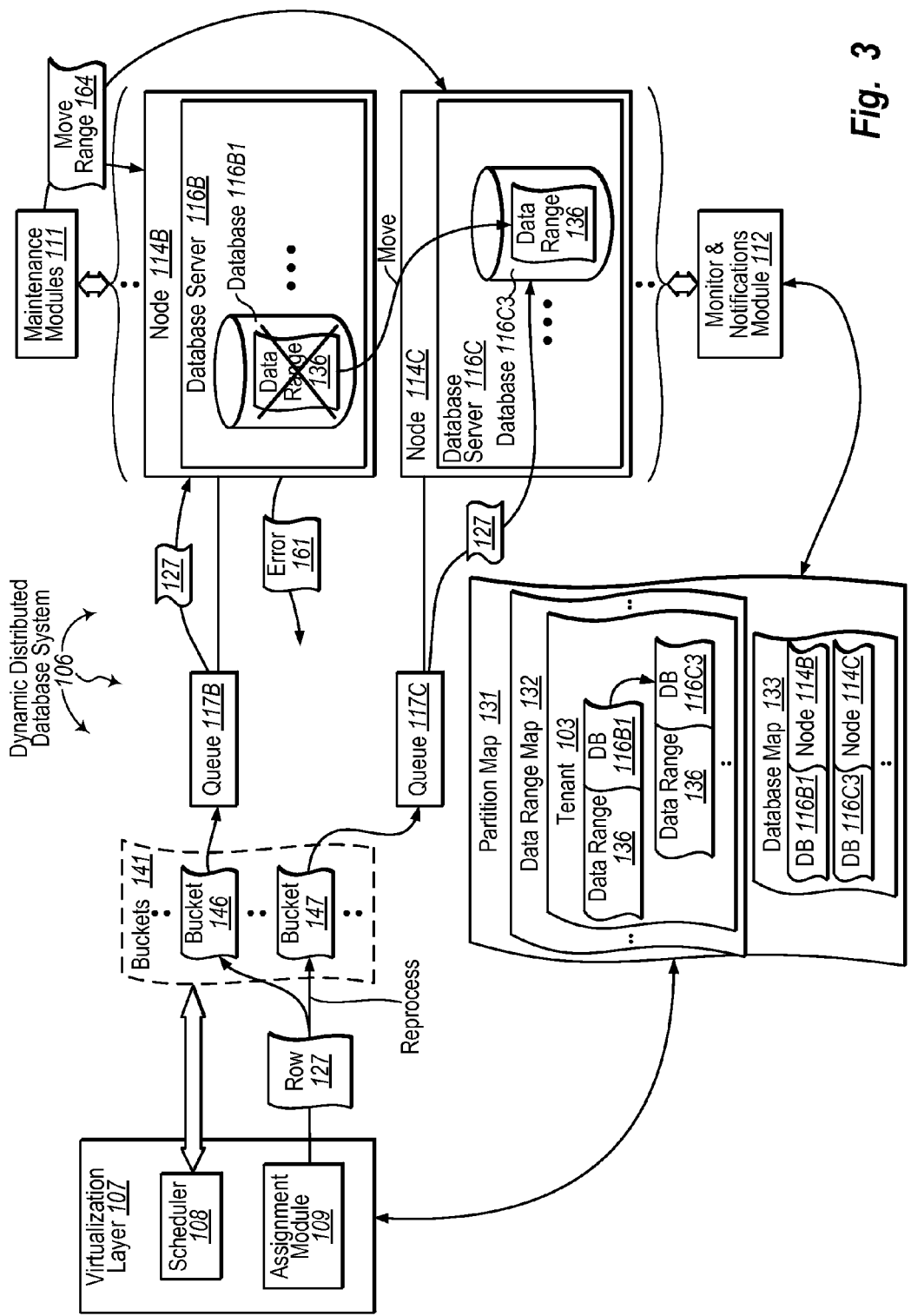
FIG. 3 illustrates the dynamic distributed database system of FIG. 1 importing data into a dynamic distributed database when a data range is moved.

FIG. 3 illustrates dynamic distributed database system 106 importing data into a dynamic distributed database when a data range is moved. Assignment module 109 can refer to data range map 132 to determine that a data value (e.g., a primary key value) in row 127 is in data range 136 and that data range 136 is mapped to database 116B1. Assignment module 109 can then refer to database map 133 to determine that database 114B1 is hosted at node 114B. Assignment module 109 can move row 127 to bucket 146. Bucket 146 can be a bucket for storing data in databases at node 114B (including database 116B1).

When a specified condition is satisfied (e.g., bucket 146 is full or a specified recurring time period expires), scheduler 108 can move bucket 146 to queue 117B. Scheduler 108 can then schedule processing of queue 117B so that row 127 is stored in database 116B1. For example, scheduler 108 can schedule a thread for queue 117B to dequeue data in bucket 146. The thread can attempt to store the dequeued data in the corresponding databases managed by database server 116B. As such, the thread can dequeue row 127 and attempt to store row 127 at database 116B1.

However, subsequent assignment module 109 referencing data range map 132, maintenance modules 111 may have moved storage for data in data range 136 from database 116B1 to database 116C3. For example, maintenance modules 111 can send move range instruction 164 to nodes 114B and 114C. Move range instruction 164 can instruct nodes 114B and 114C to interoperate to move storage for data in data range 136 from database 116B1 to database 116C3. As such, an attempt to store row 127 in database 116B1 can fail, since storage for data in data range 136 has been moved to database 116C3. Node 114B (database server 116B) can return error 161 in response to a failed attempt to store row in 127 in database 116B1.

Also subsequent assignment module 109 referencing data range map 132, monitor and notifications module 112 can update data range map 132 to indicate data range 136 has been moved from database 116B1 to 116C3.

Virtualization layer 107 can access error 161. Based on error 161, virtualization layer 107 can reprocess row 127 (without notifying a corresponding tenant of error 161). Assignment module 109 can refer to data range map 132 to determine that a data value (e.g., a primary key value) in row 127 is in data range 136 and that data range 136 is (now) mapped to database 116C3. Assignment module 109 can then refer to database map 133 to determine that database 116C3 is hosted at node 114C. Assignment module 109 can move row 127 to bucket 147. Bucket 147 can be a bucket for storing data in databases at node 114C (including database 116C3).

When a specified condition is satisfied (e.g., bucket 147 is full or a specified recurring time period expires), scheduler 108 can move bucket 147 to queue 117C. Scheduler 108 can then schedule processing of queue 117C so that row 127 is stored in database 116C3. For example, scheduler 108 can schedule a thread for queue 117C to dequeue data in bucket 147. The thread can then attempt to store the dequeued data in the corresponding databases managed by database server 116C. As such, the thread can dequeue row 127 and store row 127 at database 116C3.

Figure 4:
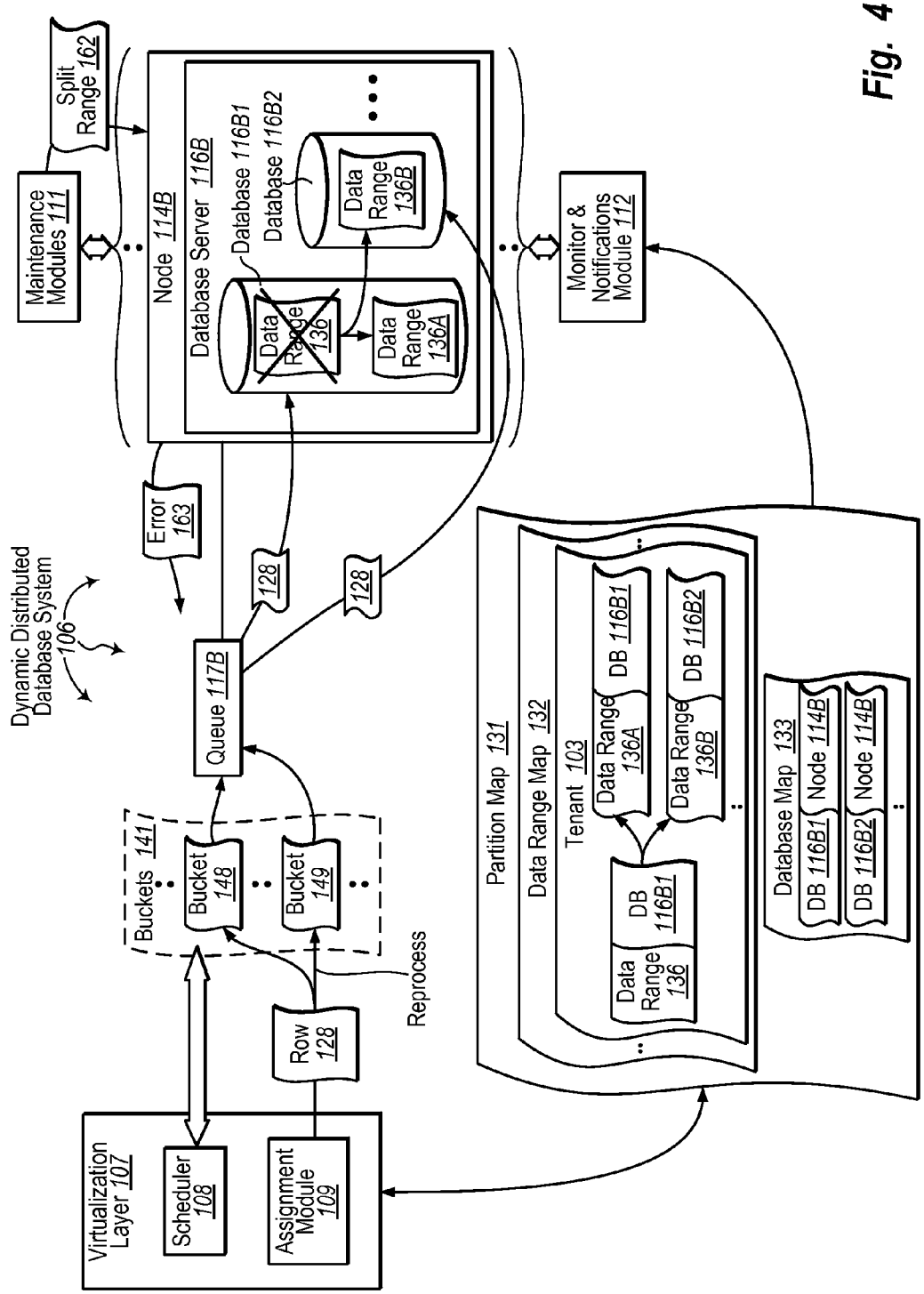
FIG. 4 illustrates the dynamic distributed database system of FIG. 1 importing data into a dynamic distributed database when a data range is split.

FIG. 4 illustrates dynamic distributed database system 106 importing data into a dynamic distributed database when a data range is split. Turning to FIG. 4, assignment module 109 can refer to data range map 132 to determine that a data value (e.g., a primary key value) in row 128 is in data range 136 and that data range 136 is mapped to database 116B1. Assignment module 109 can then refer to database map 133 to determine that database 116B1 is hosted at node 114B. Assignment module 109 can move row 128 to bucket 148. Bucket 148 can be a bucket for storing data in databases at node 114B (including database 116B1).

When a specified condition is satisfied (e.g., bucket 148 is full or a specified recurring time period expires), scheduler 108 can move bucket 148 to queue 117B. Scheduler 108 can then schedule processing of queue 117B so that row 128 is stored in database 116B1. For example, scheduler 108 can schedule a thread for queue 117B to dequeue data in bucket 148. The thread can attempt to store the dequeued data in the corresponding databases managed by database server 116B. As such, the thread can dequeue row 128 and attempt to store row 128 at database 116B1.

However, subsequent assignment module 109 referencing data range map 132, maintenance modules 111 may have split data range 136 into data ranges 136A and 136B. Storage for data in data range 136A may remain at database 116B1.

Storage for data in data range 136B can be transitioned to database 116B2. For example, maintenance modules 111 can send split range instruction 162 to node 114B. Split range instruction 162 can instruct nodes 114B split range storage for range 136 between a plurality of different databases. In response to split range instruction 162, database server 116B can split data range 136 into data ranges 136A and 136B.

As depicted, data range 136 is into two data ranges, data ranges 136A and 136B. However, maintenance modules 111 can also split a data range into three or more data ranges. Also as depicted, data ranges 136A and 136B are both at node 114B. However, maintenance modules 111 can also instruct different nodes to maintain different one or more data ranges that are split from another data range. For example, maintenance modules 111 can instruct node 114B and another node (e.g., node 114A, node 114C, or another node in machines 114) to interoperate to transition data range 136B to the other node. Similarly, maintenance modules 111 can instruct node 114B and a plurality of other nodes (e.g., node 114A, node 114C, other nodes in machines 114) to interoperate to transition data range 136A to one of the other nodes and transition data range 136B to another of the other nodes. Likewise, three or more data ranges split from data range 136 can be transitioned to node 114B and/or one or more other nodes of machines 114.

It may be that the data value (e.g., a primary key value) in row 128 is in data range 136B. As such, an attempt to store row 128 in database 116B1 can fail, since storage for data in data range 136B has been transitioned to database 116B2. Node 114B (database server 116B) can return error 163 in response to a failed attempt to store row 128 in database 116B1.

Also subsequent assignment module 109 referencing data range map 132, monitor and notifications module 112 can update data range map 132 to indicate data range 136A is mapped to database 116B1 and to indicate data range 136B is (now) mapped to database 116B2.

Virtualization layer 107 can access error 163. Based on error 163, virtualization layer 107 can reprocess row 128 (without notifying a corresponding tenant of error 161). Assignment module 109 can refer to data range map 132 to determine that a data value (e.g., a primary key) in row 128 is (now) in data range 136B and that data range 136B is mapped to database 116B2. Assignment module 109 can then refer to database map 133 to determine that database 116B2 is hosted at node 114B. Assignment module 109 can move row 128 to bucket 149. Bucket 149 can be a bucket for storing data in databases at node 114C (including database 116B2).

When a specified condition is satisfied (e.g., bucket 148 is full or a specified recurring time period expires), scheduler 108 can move bucket 148 to queue 117B. Scheduler 108 can then schedule processing of queue 117B so that row 128 is stored in database 116B2. For example, scheduler 108 can schedule a thread for queue 117B to dequeue data in bucket 148. The thread can then attempt to store the dequeued data in the corresponding databases managed by database server 116B. As such, the thread can dequeue row 128 and store row 127 at database 116B2.

When data range 136B (or some other split data range) is transitioned to a database at another node, assignment module 109 can move a row into a bucket corresponding to databases at the other node. Scheduler 108 can then move the bucket to an appropriate queue for the other node and schedule the queue for processing.

Embodiments of the invention can also detect and compensate for data import errors associated with merging data ranges.

Figure 5:
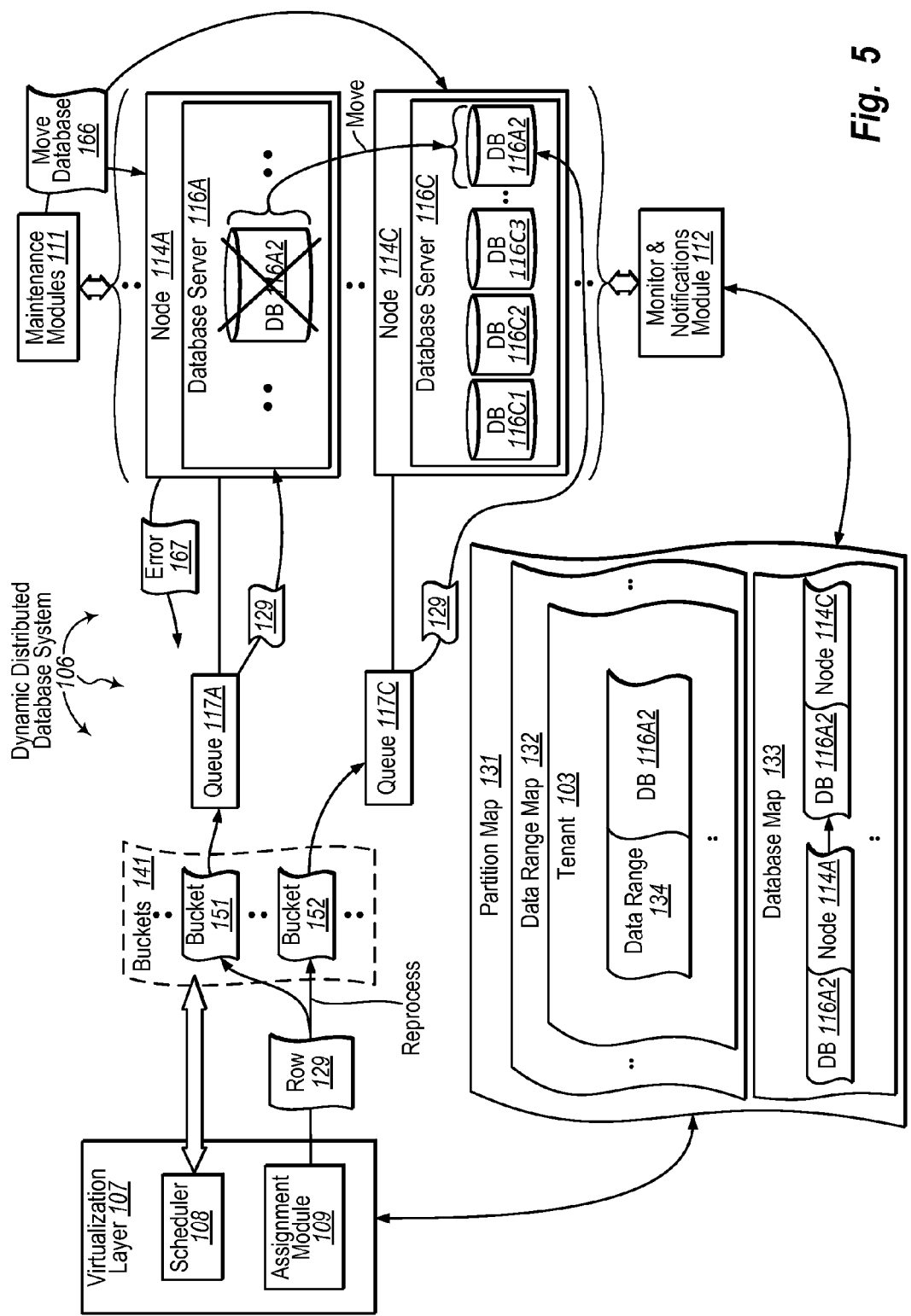
FIG. 5 illustrates the dynamic distributed database system of FIG. 1 importing data into a dynamic distributed database when a database is moved.

FIG. 5 illustrates dynamic distributed database system 106 importing data into a dynamic distributed database when a database is moved. Turning to FIG. 5, assignment module 109 can refer to data range map 132 to determine that a data value (e.g., a primary key value) in row 128 is in data range 134 and that data range 134 is mapped to database 116A1. Assignment module 109 can then refer to database map 133 to determine that database 116A1 is hosted at node 114A. Assignment module 109 can move row 129 to bucket 151. Bucket 151 can be a bucket for storing data in databases at node 114A (including database 116A2).

When a specified condition is satisfied (e.g., bucket 151 is full or a specified recurring time period expires), scheduler 108 can move bucket 151 to queue 117A. Scheduler 108 can then schedule processing of queue 117A so that row 129 is stored in database 116A2. For example, scheduler 108 can schedule a thread for queue 117A to dequeue data in bucket 151. The thread can attempt to store the dequeued data in the corresponding databases managed by database server 116A. As such, the thread can dequeue row 129 and attempt to store row 129 at database 116A2.

However, subsequent assignment module 109 referencing database map 133, maintenance modules 111 may have moved database 116A2 from node 114A to node 114C. For example, maintenance modules 111 can send move database instruction 166 to nodes 114A and 114C. Move range instruction 164 can instruct nodes 114A and 114C to interoperate to move database 116A2 from node 114A to node 114C. As such, an attempt to store row 129 at node 114A can fail, since database 116A has been moved to node 114C. Node 114A (database server 116A) can return error 167 in response to a failed attempt to store row in 129 at node 114A.

Also subsequent assignment module 109 referencing database map 133, monitor and notifications module 112 can update database map 133 to indicate data database 116A2 is hosted at node 114C.

Virtualization layer 107 can access error 167. Based on error 167, virtualization layer 107 can reprocess row 129 (without notifying a corresponding tenant of error 167). Assignment module 109 can refer to data range map 132 to determine that a data value (e.g., a primary key value) in row 128 is in data range 134 and that data range 134 is mapped to database 116A2. Assignment module 109 can then refer to database map 133 to determine that database 116A2 is hosted at node 114C. Assignment module 109 can move row 129 to bucket 152. Bucket 152 can be a bucket for storing data in databases at node 114C (including database 116A2).

When a specified condition is satisfied (e.g., bucket 152 is full or a specified recurring time period expires), scheduler 108 can move bucket 152 to queue 117C. Scheduler 108 can then schedule processing of queue 117C so that row 129 is stored in database 116A2. For example, scheduler 108 can schedule a thread for queue 117C to dequeue data in bucket 151. The thread can then attempt to store the dequeued data in the corresponding databases managed by database server 116C. As such, the thread can dequeue row 129 and store row 129 at database 116A2.

Accordingly, dynamic distributed database system 106 is configured to detect various data import errors caused by moving, splitting, and merging data ranges as well as moving databases. Dynamic distributed database system 106 is also configured to compensate for errors caused by moving, splitting, and merging data ranges as well as moving databases. When dynamic distributed database system 106 compensates for an error there may be no need to notify a relevant tenant of the error. As such, a tenant provided with a logical database view (e.g., as in FIG. 1B) is relieved from having to address errors caused by underlying data range and database changes.

Embodiments of the invention can also be used to import data into standalone non-federated databases.

Figure 6A:
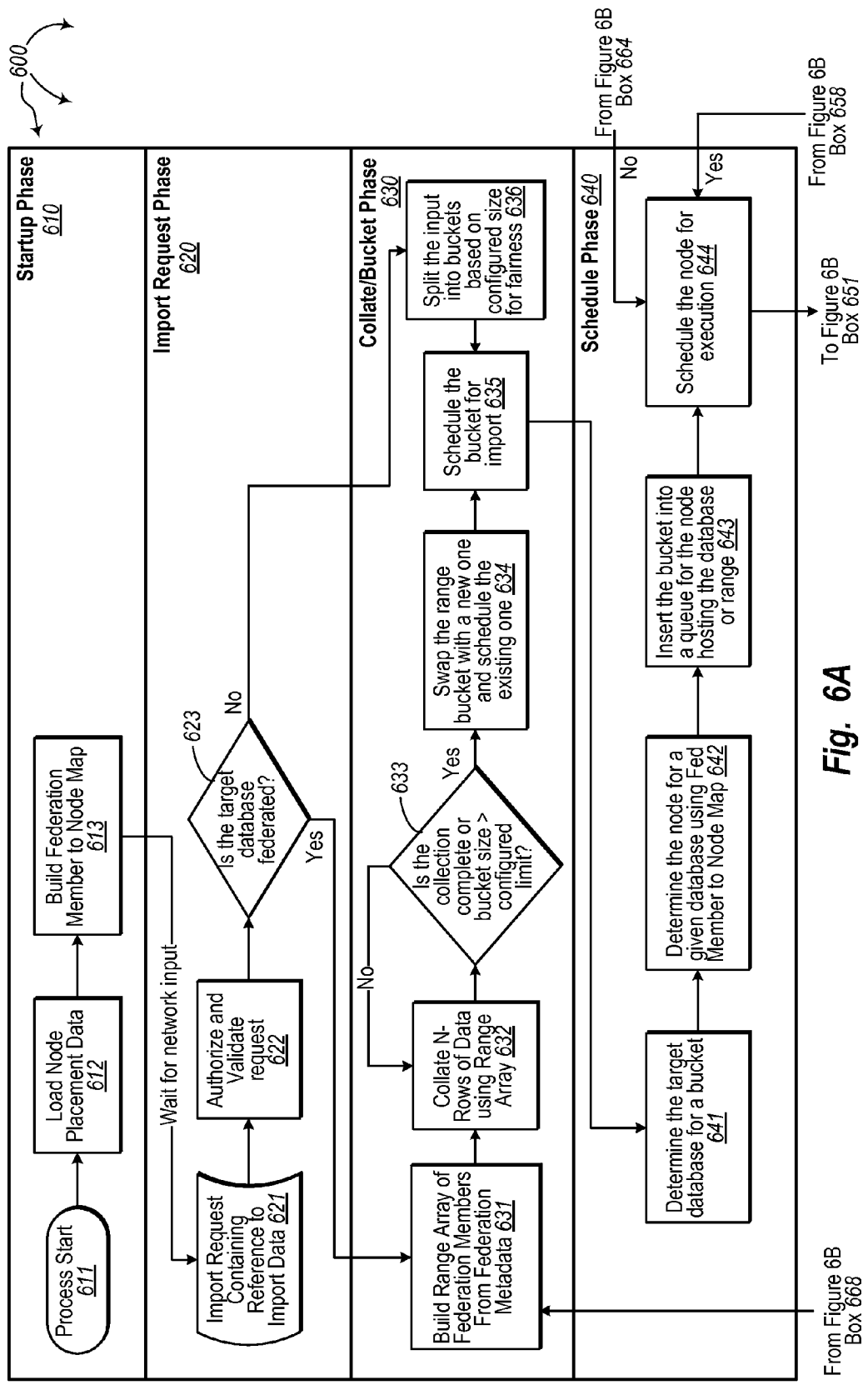
FIGS. 6A and 6B illustrates a more detailed flow chart of an example method for importing data into a dynamic distributed database.
Figure 6B:
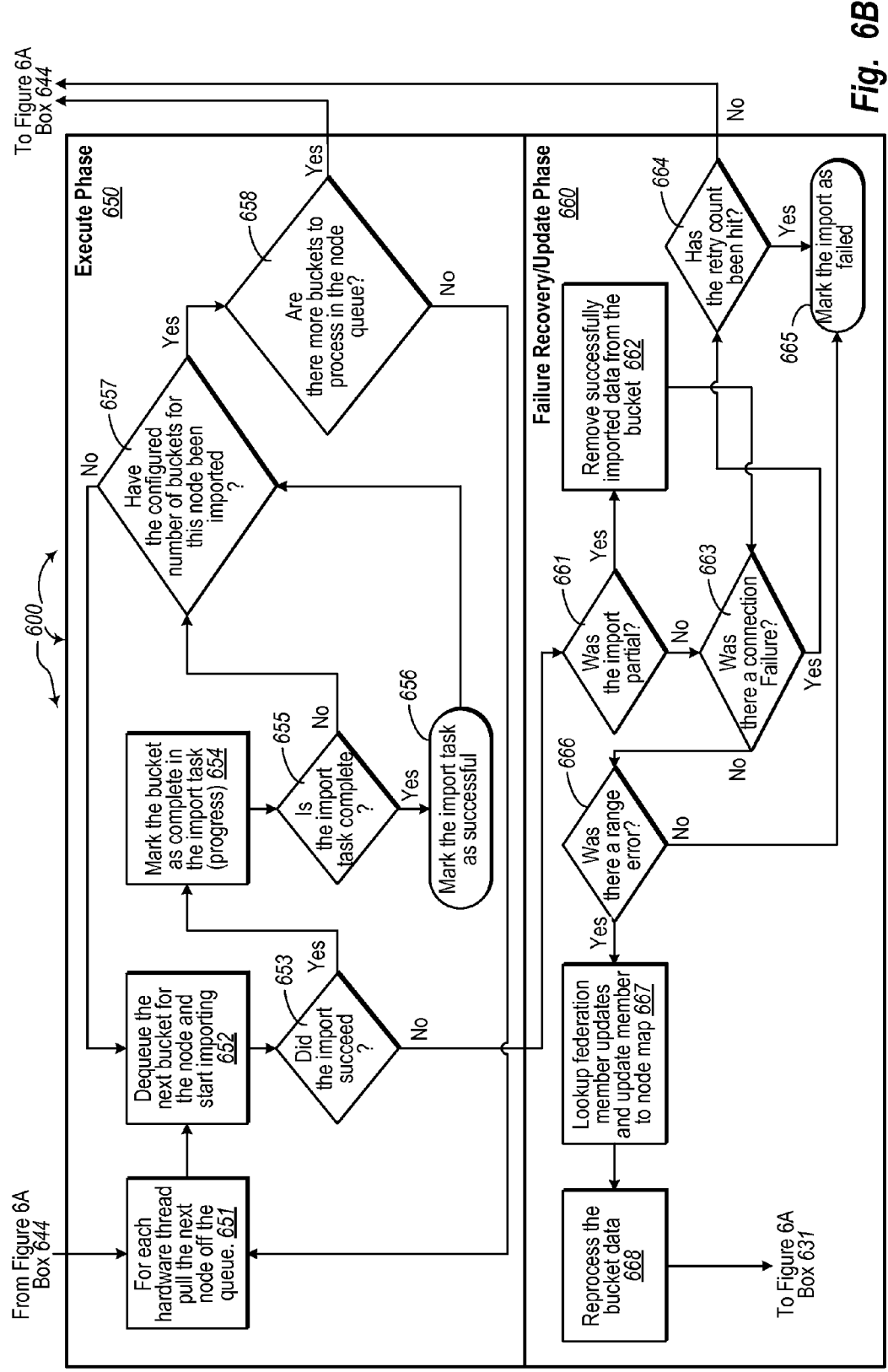

FIGS. 6A and 6B illustrates a more detailed flow chart of an example method 600 for importing data into a dynamic distributed database.

In startup phase 610, method 600 includes a process start (611). As in startup phase 610, node placement data is loaded (612) and a federation to member node map is built (613). For example, monitor and notification module 112 can build a partition map of a distributed dynamic database (e.g., a cloud database). The dynamic distributed database can then begin to wait for network input.

In import request phase 620, an import request containing reference to import data can be received (621). The request can be authorized and validated (622). It can be determined if the target database is federated (623).

If the database is non-federated (NO at 623), in a collate/bucket phase 630, import data is split into buckets based on configured size for fairness (636). If the database is federated (YES at 623), in a collate/bucket phase 630, a range of arrays of federation members is built from federation metadata (631). Federation metadata can include a partition map. In collate/bucket phase 630, N-rows of data can be collated using the range array (632). In collate/bucket phase 630, it can be determined if import of a collection is complete or if bucket size is greater than a configured limit (e.g., data contained in a bucket is or is approaching a specified size) (633).

When a collection is not complete and a bucket size is not greater than a configured limit (NO at 633), collation continues (632). When collection is complete or a bucket size is greater than a configured limit (YES at 633), the range bucket is swapped with a new one and the range bucket is scheduled for processing (634). In collate/bucket phase 630, the bucket is schedule for import (635). Collate/bucket phase 630 can be performed by virtualization layer 107 (or other similarly configured modules) through reference to a partition map (or other similarly configured data).

In a schedule phase 640, a target database for a bucket can be determined (641). In schedule phase 640, the node for a given database can be determined using a federation member to node map (642). In schedule phase 640, the bucket can be inserted into a queue for a node hosting the database or range (643). In schedule phase 640, the node is scheduled for execution (644). Schedule phase 640 can be performed by assignment module 109 and scheduler 108 (or other similarly configured modules) through reference to a partition map (or other similarly configured data).

In an execute phase 650, for each hardware thread, a next node is pulled off the queue (651). In execute phase 650, a next bucket for the thread is dequeued and import is started (652). In execute phase 650, it is determined if an import succeeded (653). If an import did not succeed (NO at 653), transition is made to a failure/recovery phase 660. If an import did succeed (YES at 653), the bucket is marked as complete in an import task (654).

In execute phase 650, it is determined if an import task is complete (655). If an import is not complete (NO at 655), it is determined if a configured number of buckets for a node have been imported (657). If an import is complete (YES at 655), the import task is marked as successful (656) and then it is determined if a configured number of buckets for a node have been imported (657). If a configured number of buckets for the node have not been imported (NO at 657), a next bucket is dequeued for the node and import is started (652). If a configured number of buckets for the node have not been imported (NO at 657), it is determined if there are buckets to process in the node queue (658). If there are buckets to process in the node queue (YES at 658), the node is scheduled for execution (644). If there are no buckets to process in the node queue (NO at 658), the next node is pulled off the queue (651). Execute phase 650 can be performed by one or more threads under the control of a dynamic distributed database system.

In failure/recovery phase 660, it is determined if an import was partially successful (661). If the import was not partially successful (NO at 661), it is determined if there was a connection failure (663). If the import was partially successful (YES at 661), successfully imported data is removed from the bucket (662) and then it is determined if there was a connection failure (663). If there was a connection failure (YES at 663), it is determined if a retry count has been reached (664). If there was not a connection failure (NO at 663), it is determined if there was a range error (666).

If a retry count has not been reached (NO at 664), the node is scheduled for execution (644). If a retry count has been reached (YES at 664), the import is marked as failed (665). If there was no range error (NO at 666), the import is also marked as failed (665). If there was a range error (YES at 666), federation updates and member to node map updates are looked up (667). Failure/recovery phase 660 includes reprocessing the bucket data (668), including building a range of arrays of federation members is from federation metadata (631). Failure/recovery phase 660 can be performed by assignment module 109 and scheduler 108 (or other similarly configured modules) through reference to a partition map (or other similarly configured data).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a processor and system memory, the computer system included in a dynamic distributed database system, the dynamic distributed database system maintaining a plurality of databases across a plurality of nodes, a method for importing data into a database maintained by the dynamic distributed database system, the method comprising:

accessing a portion of data for a tenant, the portion of tenant data within a data range of the database;

accessing a global partition map for the dynamic distributed database system, the global partition map mapping tenant data ranges to databases from among the plurality of databases and mapping databases to nodes from among the plurality of nodes;

referring to the global partition map to identify a database, from among the plurality of databases, that is to store the portion of tenant data based on the tenant data range;

referring to the global partition map to identify a node, from among the plurality of nodes, that hosts the database; and scheduling the portion of tenant data for import into the database by enqueuing the portion of tenant data in a queue for the node.

2. The method of claim 1, further comprising subsequent to scheduling the portion of tenant data for import:

accessing another portion of data for the tenant, the other portion of tenant data within the data range;

accessing the global partition map;

referring to the global partition map to identify a different database, from among the plurality of databases, that is to store the other portion of tenant data based on the data range, identification of the different database indicative of the global partition map having be automatically updated since the portion of data was scheduled for import;

referring to the global partition map to identify a different node, from among the plurality of nodes, that hosts the different database; and scheduling the other portion of tenant data for import into the different database by enqueuing the other portion of tenant data in a queue for the different node.

3. The method of claim 1, further comprising subsequent to scheduling the portion of tenant data for import:

accessing another portion of data for the tenant, the other portion of tenant data within another different data range of the database;

accessing the global partition map;

referring to the global partition map to identify a different database, from among the plurality of databases, that is to store the other portion of tenant data based on the other data range;

referring to the global partition map to identify a different node, from among the plurality of nodes, that hosts the different database; and scheduling the other portion of tenant data for import into the different database by enqueuing the other portion of tenant data in a queue for the different node.

4. The method of claim 3, wherein accessing the portion of tenant data and accessing the other portion of tenant data comprises accessing input rows to the database.

5. The method of claim 1, wherein scheduling the portion of tenant data for import into the database comprises:

inserting the portion of tenant data into a bucket corresponding to the data range for the database; and inserting the bucket into the queue for the node.

6. The method of claim 5, further comprising:

when a specified condition is satisfied, dequeuing the bucket from the queue; and attempting to import the portion of tenant data into the database at the node.

7. The method of claim 6, further comprising detecting that the import did not succeed.

8. The method of claim 7, further comprising:

determining that the import was partially successful; and removing any successfully imported tenant data from the bucket.

9. The method of claim 7, further comprising subsequent to inserting the portion of tenant data into the bucket:

detecting that there was a range error for the portion of tenant data;

referring to the global partition map to determine that one or more updates to the dynamic distributed database system have occurred, at least one of the one or more updates relevant to importing the portion of tenant data; and sending the bucket for reprocessing.

10. The method of claim 5, wherein inserting the portion of tenant data into a bucket corresponding to the data range for the database comprises batching the portion of tenant data with a further portion of tenant data in the bucket, the further portion of tenant data also within the data range, the portion of tenant data and the further portion of tenant data received in different import requests.

11. The method of claim 5, wherein inserting the bucket into the queue for the node comprises batching the bucket with other buckets in the queue, the other buckets corresponding to other databases hosted at the node.

12. The method of claim 1, wherein the dynamic distributed database system includes a plurality of distributed databases for a plurality of tenants, each distributed database including one or more of the plurality of databases.

13. A computer program product for use at computer system, the computer system included in a dynamic distributed database system, the dynamic distributed database system maintaining a plurality of databases across a plurality of nodes, the computer program product for implementing a method for importing data into a database maintained by the dynamic distributed database system, the computer program product comprising one or more computer storage devices having stored thereon computer-executable instructions that, when executed at a processor, cause the computer system to perform the method including the following:

access a portion of data for a tenant, the portion of tenant data within a data range of the database;

access a global partition map for the dynamic distributed database system, the global partition map mapping tenant data ranges to databases from among the plurality of databases and mapping databases to nodes from among the plurality of nodes;

refer to the global partition map to identify a database, from among the plurality of databases, that is to store the portion of tenant data based on the tenant data range;

refer to the global partition map to identify a node, from among the plurality of nodes, that hosts the database; and schedule the portion of tenant data for import into the database by enqueuing the portion of tenant data in a queue for the node.

14. The computer program product of claim 13, further computer-executable instructions that, when executed, cause the computer system to subsequent to scheduling the portion of tenant data for import:

access another portion of data for the tenant, the other portion of tenant data within the data range;

access the global partition map;

refer to the global partition map to identify a different database, from among the plurality of databases, that is to store the other portion of tenant data based on the data range, identification of the different database indicative of the global partition map having be automatically updated since the portion of data was scheduled for import;

refer to the global partition map to identify a different node, from among the plurality of nodes, that hosts the different database; and schedule the other portion of tenant data for import into the different database by enqueuing the other portion of tenant data in a queue for the different node.

15. The computer program product of claim 13, further computer-executable instructions that, when executed, cause the computer system to subsequent to scheduling the portion of tenant data for import:

access another portion of data for the tenant, the other portion of tenant data within another different data range of the database;

access the global partition map;

refer to the global partition map to identify a different database, from among the plurality of databases, that is to store the other portion of tenant data based on the other data range;

refer to the global partition map to identify a different node, from among the plurality of nodes, that hosts the different database; and schedule the other portion of tenant data for import into the different database by enqueuing the other portion of tenant data in a queue for the different node.

16. The computer program product of claim 15, computer-executable instructions that, when executed, cause the computer system to access the portion of tenant data and accessing the other portion of tenant data comprise computer-executable instructions that, when executed, cause the computer system to access input rows to the database.

17. The computer program product of claim 13, wherein the dynamic distributed database system includes a plurality of distributed databases for a plurality of tenants, each distributed database including one or more of the plurality of databases.

18. A computer system, the computer system included in a dynamic distributed database system, the dynamic distributed database system maintaining a plurality of databases across a plurality of nodes, the computer system comprising:

one or more processors;

system memory; and one or more computer storage devices having stored thereon computer-executable instructions representing a virtualization module, the virtualization module configured to:

access a portion of data for a tenant, the portion of tenant data within a data range of a database;

access a global partition map for the dynamic distributed database system, the global partition map mapping tenant data ranges to databases from among the plurality of databases and mapping databases to nodes from among the plurality of nodes;

refer to the global partition map to identify a database, from among the plurality of databases, that is to store the portion of tenant data based on the tenant data range;

refer to the global partition map to identify a node, from among the plurality of nodes, that hosts the database; and schedule the portion of tenant data for import into the database by enqueuing the portion of tenant data in a queue for the node.

19. The computer system of claim 18, wherein the virtualization module is further configured to:

access another portion of data for the tenant, the other portion of tenant data within the data range;

access the global partition map;

refer to the global partition map to identify a different database, from among the plurality of databases, that is to store the other portion of tenant data based on the data range, identification of the different database indicative of the global partition map having be automatically updated since the portion of data was scheduled for import;

refer to the global partition map to identify a different node, from among the plurality of nodes, that hosts the different database; and schedule the other portion of tenant data for import into the different database by enqueuing the other portion of tenant data in a queue for the different node.

20. The computer system of claim 18, wherein the virtualization module is further configured to:

access another portion of data for the tenant, the other portion of tenant data within another different data range of the database;

access the global partition map;

refer to the global partition map to identify a different database, from among the plurality of databases, that is to store the other portion of tenant data based on the other data range;

refer to the global partition map to identify a different node, from among the plurality of nodes, that hosts the different database; and schedule the other portion of tenant data for import into the different database by enqueuing the other portion of tenant data in a queue for the different node.

\* \* \* \* \*